(12) United States Patent
Teraya

(10) Patent No.: US 12,487,715 B2
(45) Date of Patent: Dec. 2, 2025

(54) CONDUCTIVE SHEET, TOUCH SENSOR, AND METHOD FOR MANUFACTURING TOUCH SENSOR

(71) Applicant: NISSHA CO., LTD., Kyoto (JP)

(72) Inventor: Satomi Teraya, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 0 days.

(21) Appl. No.: 18/287,578

(22) PCT Filed: Apr. 25, 2022

(86) PCT No.: PCT/JP2022/018770
§ 371 (c)(1),
(2) Date: Oct. 19, 2023

(87) PCT Pub. No.: WO2022/244602
PCT Pub. Date: Nov. 24, 2022

(65) Prior Publication Data
US 2024/0201815 A1    Jun. 20, 2024

(30) Foreign Application Priority Data

May 20, 2021    (JP) ................................ 2021-085678

(51) Int. Cl.
| | | |
|---|---|---|
| *G06F 3/044* | (2006.01) | |
| *G06F 3/041* | (2006.01) | |
| *G06F 3/047* | (2006.01) | |

(52) U.S. Cl.
CPC .......... *G06F 3/0445* (2019.05); *G06F 3/0412* (2013.01); *G06F 3/0446* (2019.05);
(Continued)

(58) Field of Classification Search
CPC ......... G06F 3/0446; G06F 2203/04112; G06F 3/0448; G06F 2203/04103;
(Continued)

(56) References Cited

U.S. PATENT DOCUMENTS

| | | |
|---|---|---|
| 9,417,748 B2 | 8/2016 | Tokai et al. |
| 10,430,004 B2 | 10/2019 | Seo et al. |
| (Continued) | | |

FOREIGN PATENT DOCUMENTS

| | | |
|---|---|---|
| JP | 2006-344163 A | 12/2006 |
| JP | 2015-106342 A | 6/2015 |
| (Continued) | | |

OTHER PUBLICATIONS

International Search Report PCT/JP2022/018770 dated Jul. 12, 2022 (pp. 1-3).
(Continued)

*Primary Examiner* — Dismery Mercedes
(74) *Attorney, Agent, or Firm* — Millen, White, Zelano & Branigan, P.C.; Jennifer L. King; William F. Nixon

(57) ABSTRACT

A conductive sheet includes less visible thin metal wires. The conductive sheet includes a transparent substrate and a first conductive pattern on a first surface of the transparent substrate. The first conductive pattern includes multiple first thin metal wires extending in a first direction and arranged in a second direction. The first conductive pattern includes multiple second thin metal wires extending in the second direction and arranged in the first direction. The first thin metal wires extending in the first direction and the second thin metal wires extending in the second direction commonly include first bent wires at their intersections. The first thin metal wires and the second thin metal wires form first obtuse angles. The first bent wires connect first obtuse angles. The conductive sheet is incorporated in a touch sensor and a method of manufacturing the touch sensor.

20 Claims, 7 Drawing Sheets

(52) U.S. Cl.
CPC ............ *G06F 3/0448* (2019.05); *G06F 3/047* (2013.01); *G06F 2203/04103* (2013.01); *G06F 2203/04111* (2013.01); *G06F 2203/04112* (2013.01); *H05K 2201/09681* (2013.01)

(58) Field of Classification Search
CPC ......... G06F 2203/04111; G06F 3/0445; G06F 3/0412; G06F 3/041; G06F 2203/0339; G06F 3/044; G06F 3/0443; H05K 2201/09681; H05K 1/0296; H05K 2201/0108; H05K 9/0086; H05K 9/0084; G09G 2300/0426

See application file for complete search history.

(56) References Cited

U.S. PATENT DOCUMENTS

| | | | |
|---|---|---|---|
| 10,558,312 | B2 | 2/2020 | Sakaue et al. |
| 11,194,433 | B2* | 12/2021 | Kwon .................. G06F 3/0446 |
| 2007/0065631 | A1* | 3/2007 | Sugiura .................. B28B 3/269 |
| | | | 428/116 |
| 2011/0310037 | A1* | 12/2011 | Moran ................. H05K 9/0094 |
| | | | 174/253 |
| 2012/0019450 | A1* | 1/2012 | Huang .................. G06F 3/0445 |
| | | | 345/173 |
| 2012/0261242 | A1* | 10/2012 | Guard ................... G06F 3/0445 |
| | | | 200/600 |
| 2013/0068952 | A1* | 3/2013 | Kuwabara ............... G01T 1/243 |
| | | | 250/366 |
| 2013/0294037 | A1* | 11/2013 | Kuriki ..................... H05K 9/00 |
| | | | 174/250 |
| 2014/0055380 | A1* | 2/2014 | Han ........................ G06F 3/041 |
| | | | 345/173 |
| 2017/0075449 | A1* | 3/2017 | Ko ........................... G06F 3/047 |
| 2017/0102804 | A1* | 4/2017 | Kikukawa ............... G06F 3/047 |
| 2017/0309247 | A1* | 10/2017 | Hung ....................... G09G 5/02 |
| 2019/0204957 | A1 | 7/2019 | Nakagome et al. |
| 2020/0050300 | A1* | 2/2020 | Kwon .................. G06F 3/0446 |
| 2020/0117301 | A1* | 4/2020 | Nakayama ............ G06F 3/0446 |
| 2020/0249796 | A1* | 8/2020 | Hara .................... H10K 59/352 |
| 2023/0208052 | A1* | 6/2023 | Lee ..................... H01Q 1/1271 |
| | | | 343/702 |

FOREIGN PATENT DOCUMENTS

| | | |
|---|---|---|
| JP | 2015109067 A | 6/2015 |
| JP | 2017074749 A | 4/2017 |
| JP | 2017211774 A | 11/2017 |
| JP | 2018521398 A | 8/2018 |
| JP | 2019075069 A | 5/2019 |

OTHER PUBLICATIONS

Supplementary European Search Report dated Sep. 4, 2024 issued in corresponding EP 22804516 application (2 pages).
Supplementary European Search Report dated Oct. 9, 2024 issued in corresponding EP 22804516.7 application (5 pages).

* cited by examiner

CONDUCTIVE SHEET, TOUCH SENSOR, AND METHOD FOR MANUFACTURING TOUCH SENSOR

TECHNICAL FIELD

The present invention relates to a conductive sheet, a touch sensor, and a method for manufacturing a touch sensor, and more particularly, to a conductive sheet, a touch sensor, and a method for manufacturing a touch sensor each including a thin metal wire mesh.

BACKGROUND

A known conductive sheet used for, for example, electrodes in a touch sensor includes a thin metal wire mesh on a transparent substrate. The mesh is typically a lattice patterned with polygons such as rhombuses or hexagons. Such a thin metal wire mesh may be formed by printing conductive ink in a pattern or etching metal foil in a pattern.

CITATION LIST

Patent Literature

Patent Literature 1: Japanese Unexamined Patent Application Publication No. 2006-344163

BRIEF SUMMARY

Technical Problem

However, when thin metal wires intersect with one another at acute angles, conductive ink may bleed at the intersections, or an etching solution may not fully reach the intersections. This may increase the areas of the thin metal wires at the intersections and cause the thin metal wires to be visible.

One or more aspects of the present disclosure are directed to a conductive sheet, a touch sensor, and a method for manufacturing a touch sensor each including less visible thin metal wires.

Solution to Problem

In response to the above, a conductive sheet according to a first aspect includes a transparent substrate and a first conductive pattern on a surface of the transparent substrate. The first conductive pattern includes a plurality of first thin metal wires extending in a first direction and a plurality of second thin metal wires extending in a second direction and intersecting with the plurality of first thin metal wires. The plurality of first thin metal wires and the plurality of second thin metal wires are in a mesh with a plurality of first openings arranged consecutively in the first direction and the second direction. The plurality of first thin metal wires and the plurality of second thin metal wires commonly include a plurality of first bent wires at intersections of the plurality of first thin metal wires and the plurality of second thin metal wires. The plurality of first bent wires connect facing first obtuse angles formed by the plurality of first thin metal wires and the plurality of second thin metal wires.

A conductive sheet according to a second aspect is the conductive sheet according to the first aspect in which each of the plurality of first thin metal wires includes a first metal side extending from a first bent wire to an adjacent first bent wire of the plurality of first bent wires. Each of the plurality of second thin metal wires includes a second metal side extending from a first bent wire to an adjacent first bent wire of the plurality of first bent wires. The first metal side and the second metal side facing each other across a first bent wire of the plurality of first bent wires have a same length.

A conductive sheet according to a third aspect is the conductive sheet according to the first aspect or the second aspect in which first bent wires of the plurality of first bent wires at two ends of the first metal side or at two ends of the second metal side are parallel to each other.

This structure includes the first bent wires connecting the first obtuse angles facing one another and thus increases the angles formed by the first thin metal wires and the second thin metal wires. The thin metal wires in the conductive sheet can thus be patterned precisely at the intersections and can be less visible.

A conductive sheet according to a fourth aspect is the conductive sheet according to any one of the first to third aspects further including a second conductive pattern on another surface of the transparent substrate. The second conductive pattern includes a plurality of third thin metal wires extending in the first direction without overlapping the plurality of first thin metal wires and a plurality of fourth thin metal wires extending in the second direction and intersecting with the plurality of third thin metal wires without overlapping the plurality of second thin metal wires. The plurality of third thin metal wires and the plurality of fourth thin metal wires are in a mesh with a plurality of second openings arranged consecutively in the first direction and the second direction. The plurality of third thin metal wires and the plurality of fourth thin metal wires commonly include a plurality of second bent wires at intersections of the plurality of third thin metal wires and the plurality of fourth thin metal wires. The plurality of second bent wires connect facing second obtuse angles formed by the plurality of third thin metal wires and the plurality of fourth thin metal wires.

A conductive sheet according to a fifth aspect is the conductive sheet according to the fourth aspect in which each of the plurality of third thin metal wires includes a third metal side extending from a second bent wire to an adjacent second bent wire of the plurality of second bent wires. Each of the plurality of fourth thin metal wires includes a fourth metal side extending from a second bent wire to an adjacent second bent wire of the plurality of second bent wires. The third metal side and the fourth metal side facing each other across a second bent wire of the plurality of second bent wires have a same length.

A conductive sheet according to a sixth aspect is the conductive sheet according to the fourth aspect or the fifth aspect in which second bent wires of the plurality of second bent wires at two ends of the third metal side or at two ends of the fourth metal side are parallel to each other.

This structure can reduce the metal areas of thin metal wires at the intersections on the opposite sides of the transparent substrate. The thin metal wires in the conductive sheet are thus less visible.

A conductive sheet according to a seventh aspect is the conductive sheet according to any one of the fourth to sixth aspects in which each of the plurality of second bent wires is at a center of a corresponding first opening of the plurality of first openings.

This structure can have the first conductive pattern and the second conductive pattern without being close to each other and thus can avoid having visible thin metal wires resulting from differences in their densities.

A conductive sheet according to an eighth aspect is the conductive sheet according to any one of the fourth to seventh aspects in which each of the plurality of second thin metal wires includes a plurality of first disconnected portions each including no thin metal wire between a first bent wire and an adjacent first bent wire of the plurality of first bent wires. Each of the plurality of third thin metal wires includes a plurality of second disconnected portions each including no thin metal wire between a second bent wire and an adjacent second bent wire of the plurality of second bent wires. The plurality of first disconnected portions have no intersection with the plurality of second disconnected portions.

A conductive sheet according to a ninth aspect is the conductive sheet according to the eighth aspect in which each of the plurality of second thin metal wires includes a plurality of the second metal sides and the plurality of first disconnected portions arranged alternately. Each of the plurality of third thin metal wires includes a plurality of the third metal sides and the plurality of second disconnected portions arranged alternately.

This structure with the first disconnected portions and the second disconnected portions can vary patterns without the thin metal wires having nonuniform densities and thus have less visible thin metal wire patterns and reduce moire.

A touch sensor according to a tenth aspect includes the conductive sheet according to the fourth aspect, a terminal, and routing wiring. The conductive sheet includes a plurality of the first conductive patterns serving as a plurality of first electrodes and a plurality of the second conductive patterns serving as a plurality of second electrodes. The conductive sheet includes a plurality of first connectors on ends of the plurality of first electrodes and a plurality of second connectors on ends of the plurality of second electrodes. The terminal is connectable to external wiring. The routing wiring connects the plurality of first connectors and the plurality of second connectors to the terminal.

This structure includes the first electrodes being the first conductive pattern and the second electrodes being the second conductive pattern in which the thin metal wires are less visible. The thin metal wires in the touch sensor are thus less visible.

A method according to an eleventh aspect is a method for manufacturing a touch sensor. The method includes sequentially forming a first blackened film layer, a metal film layer, and a second blackened film layer on opposite surfaces of a transparent substrate, and simultaneously forming, on a first surface of the transparent substrate, a plurality of first electrodes each including a first conductive pattern, a plurality of first connectors on ends of the plurality of first electrodes, a first terminal connectable to external wiring, and first routing wiring connecting the plurality of first connectors and the first terminal, and, on a second surface of the transparent substrate, a plurality of second electrodes each including a second conductive pattern, a plurality of second connectors on ends of the plurality of second electrodes, a second terminal connectable to external wiring, and second routing wiring connecting the plurality of second connectors and the second terminal. The first conductive pattern includes a plurality of first thin metal wires extending in a first direction and a plurality of second thin metal wires extending in a second direction and intersecting with the plurality of first thin metal wires. The plurality of first thin metal wires and the plurality of second thin metal wires are in a mesh with a plurality of first openings arranged consecutively in the first direction and the second direction. The second conductive pattern includes a plurality of third thin metal wires extending in the first direction without overlapping the plurality of first thin metal wires and a plurality of fourth thin metal wires extending in the second direction and intersecting with the plurality of third thin metal wires without overlapping the plurality of second thin metal wires. The plurality of third thin metal wires and the plurality of fourth thin metal wires are in a mesh with a plurality of second openings arranged consecutively in the first direction and the second direction. The plurality of first thin metal wires and the plurality of second thin metal wires commonly include a plurality of first bent wires at intersections of the plurality of first thin metal wires and the plurality of second thin metal wires. The plurality of first bent wires connect facing first obtuse angles formed by the plurality of first thin metal wires and the plurality of second thin metal wires. The plurality of third thin metal wires and the plurality of fourth thin metal wires commonly include a plurality of second bent wires at intersections of the plurality of third thin metal wires and the plurality of fourth thin metal wires. The plurality of second bent wires connect facing second obtuse angles formed by the plurality of third thin metal wires and the plurality of fourth thin metal wires.

This method allows the electrodes, the connectors, the terminals, and the routing wiring to be formed simultaneously, and thus can reduce the number of processes and the manufacturing time.

Advantageous Effects

The conductive sheet, the touch sensor, and the method for manufacturing a touch sensor according to the above aspects of the present invention each include less visible thin metal wires.

DETAILED DESCRIPTION

A first embodiment of the present invention will now be described with reference to FIGS. 1 to 4.

First Embodiment

Figure 1:
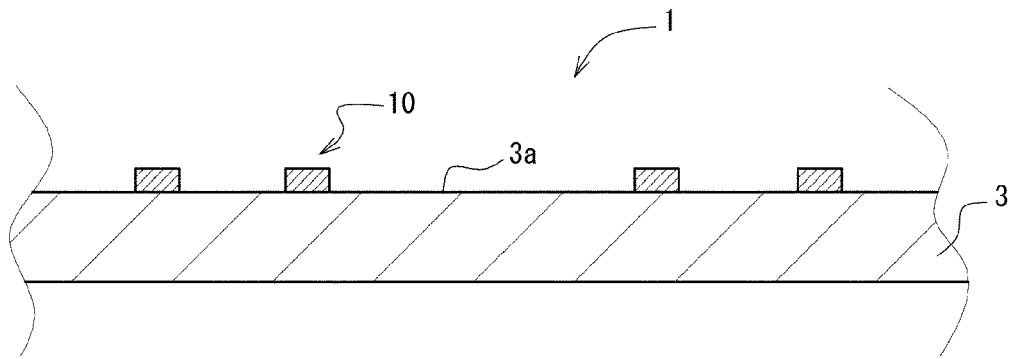
FIG. 1 is a schematic cross-sectional view of a conductive sheet 1 according to a first embodiment of the present invention.
Figure 2:
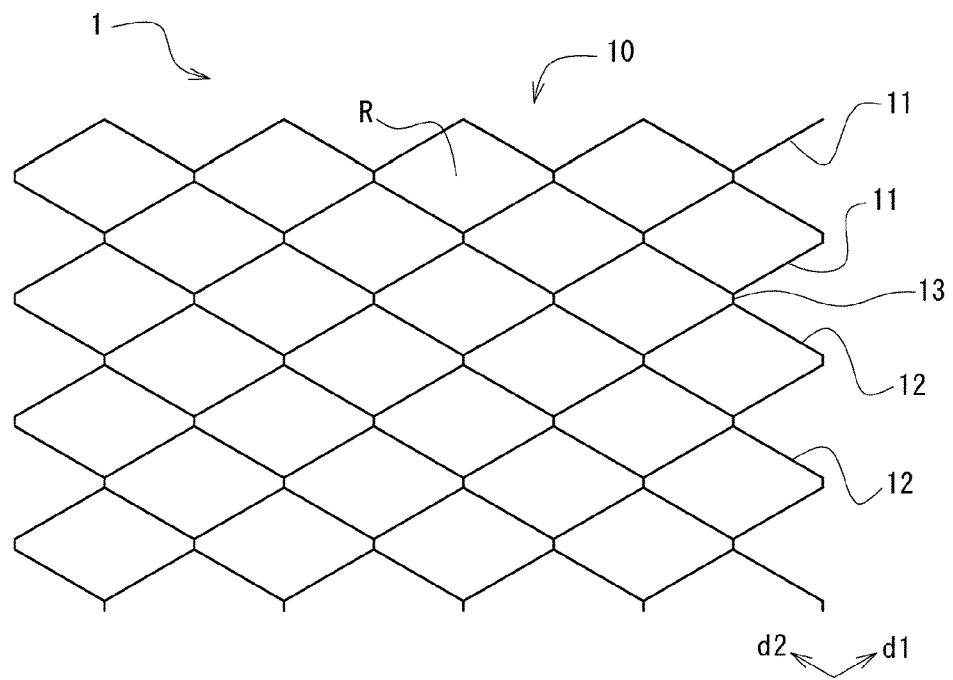
FIG. 2 is a schematic plan view of the conductive sheet 1 according to the first embodiment of the present invention.
Figure 3:
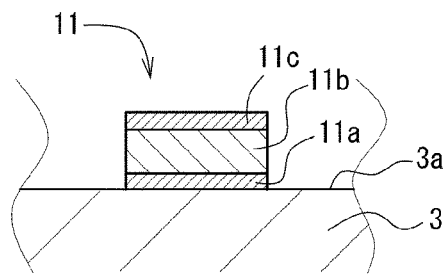
FIG. 3 is an enlarged partial cross-sectional view of the conductive sheet 1 according to the first embodiment of the present invention, showing a first thin metal wire 11.

As shown in FIG. 1, a conductive sheet 1 according to the first embodiment of the present invention includes a transparent substrate 3 and a first conductive pattern 10 on a first surface 3a of the transparent substrate 3. The first conductive pattern 10 shown in FIG. 2 is viewed in plan from the first surface 3a. The first conductive pattern 10 includes multiple first thin metal wires 11 extending in a first direction d1 and arranged in a second direction d2, and multiple second thin metal wires 12 extending in the second direction d2 and arranged in the first direction d1. The first thin metal wires 11 and the second thin metal wires 12 intersect with one another to consecutively define multiple first openings R in the first direction d1 and the second direction d2 on the first surface 3a of the transparent substrate 3. The first thin metal wires 11 and the second thin metal wires 12 commonly include first bent wires 13 at their intersections. As shown in FIG. 3, the first thin metal wires 11 each include a first blackened layer 11a, a metal layer 11b, and a second blackened layer 11c stacked together in this order on the first surface 3a of the transparent substrate 3. The first blackened layers 11a and the second blackened layers 11c reduce the reflectance of the first thin metal wires 11 and thus reduce glares and any visible pattern. Similarly, the second thin metal wires 12 each include three layers, or specifically, a first blackened layer, a metal layer, and a second blackened layer.

The transparent substrate 3 may be formed from any flexible material. Examples of the material include polyesters such as polyethylene terephthalate (PET), polylactic acid (PLA), and polyethylene naphthalate (PEN), polyolefins such as polyethylene (PE), polypropylene (PP), polystyrene, ethylene-vinyl acetate (EVA), cyclo-olefin polymer (COP), and cyclo-olefin copolymer (COC), and resin films such as vinyl resins, polycarbonate (PC), polyamide, polyimide (PI), acrylic resins (PMMA), triacetyl cellulose (TAC), polyurethane, silicone, polyvinyl chloride, and polyvinyl fluoride. The transparent substrate 3 may have a thickness of 5 to 500 μm, or more specifically, 20 to 100 μm.

The transparent substrate 3 may be a single layer film or a film with multiple layers stacked together. The transparent substrate 3 may include a phase difference film.

Examples of the material for the metal layer include, but are not limited to, gold, silver, copper, iron, nickel, chromium, aluminum, molybdenum, titanium, or an alloy of these materials. Examples of the material for the first blackened layers and the second blackened layers include metal oxides or metal nitrides of metals such as copper, nickel, chromium, aluminum, molybdenum, and titanium.

The first thin metal wires 11 and the second thin metal wires 12 may have a wire width of, for example, 1 to 10 μm, or more specifically, 1 to 5 μm. The first thin metal wires 11 and the second thin metal wires 12 may have a film thickness of, for example, 120 nm to 1.2 μm. The first blackened layers and the second blackened layers may have a film thickness of, for example, 10 to 100 nm. The metal layers may have a film thickness of, for example, 100 nm to 1 μm. The first thin metal wires 11 and the second thin metal wires 12 may be in a mesh with an opening ratio of 90% or greater, or more specifically, 95% or greater.

The first conductive pattern 10 will be described in detail below.

Figure 4:
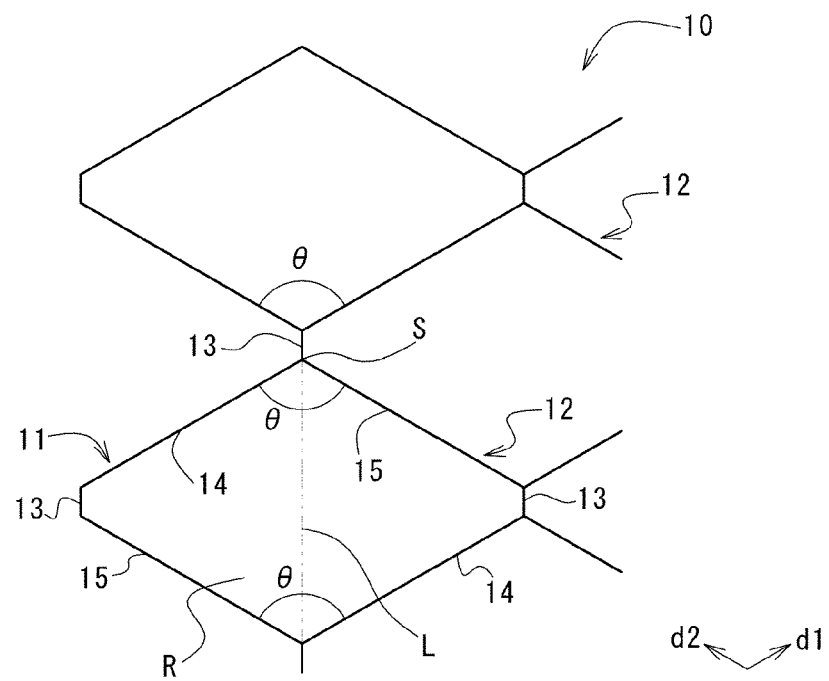
FIG. 4 is an enlarged partial plan view of the conductive sheet 1 according to the first embodiment of the present invention, showing a first conductive pattern 10.

FIG. 4 is an enlarged partial plan view of the conductive sheet 1 viewed from the first surface 3a of the transparent substrate 3, showing a part of the first conductive pattern 10. The first thin metal wires 11 extending in the first direction d1 and the second thin metal wires 12 extending in the second direction d2 commonly include the first bent wires 13 at their intersections. The first thin metal wires 11 and the second thin metal wires 12 commonly include a single first bent wire 13 at each of their intersections. The first thin metal wires 11 and the second thin metal wires 12 form first obtuse angles θ. Each first bent wire 13 connects two first obtuse angles θ to each other.

As shown in FIG. 4, the first thin metal wires 11 have first metal sides 14 as thin metal wires each extending from one first bent wire 13 to an adjacent first bent wire 13. Similarly, the second thin metal wires 12 have second metal sides 15 as thin metal wires each extending from one first bent wire 13 to an adjacent first bent wire 13. The first metal sides 14 and the second metal sides 15 each have two ends connected to the corresponding first bent wires 13. The first metal side 14 and the second metal side 15 form the first obtuse angle θ. The first metal side 14 and the second metal side 15 intersect with each other at an intersection S. The first metal side 14 and the second metal side 15 form the first obtuse angle θ with the intersection S as the center. Two first bent wires 13, two first metal sides 14, and two second metal sides 15 define a first opening R. The first openings R are located consecutively in the first direction and the second direction on the entire first surface 3a of the transparent substrate 3. A single first opening R includes two first obtuse angles θ. An imaginary centerline L extends through the two first obtuse angles θ to connect two intersections S.

The first metal side 14 and the first metal side 15 facing each other across the first bent wire 13 have the same length. In other words, the first metal side 14 and the second metal side 15 forming the first obtuse angle θ have the same length. Thus, the first metal sides 14 and the second metal sides 15 on the first surface 3a of the transparent substrate 3 all have the same length. Two first metal sides 14 and two second metal sides 15 defining each first opening R have the same length.

Two first bent wires 13 connected to the two ends of each first metal side 14 are parallel to each other. Similarly, two first bent wires 13 connected to the two ends of each second metal side 15 are parallel to each other. Two first bent wires 13 defining a single first opening R are parallel to each other. The first bent wires 13 in the first conductive pattern 10 have the same length. A line segment connecting end points of the first metal side 14 and the second metal side 15 opposite to the intersection S is orthogonal to the centerline L. The first bent wires 13 each connect facing first obtuse angles θ to connect facing first openings R and two first centerlines L. Each first bent wire 13 is on an extension from the corresponding first centerline L. The first opening R is line symmetric with respect to the corresponding centerline L. The first metal side 14 and the first bent wire 13 form a right angle or an obtuse angle. The second metal side 15 and the first bent wire 13 form a right angle or an obtuse angle.

The first metal sides 14 and the second metal sides 15 each have a length appropriate for the application of the conductive sheet 1, the intended resistance value, and the size of the transparent substrate 3, and may be 300 to 1300 µm. The bent wires 13 may each have a length of 8 to 20 µm. The bent wire 13 with a length of 8 µm or longer can prevent an increase in the areas at intersections in which metal remains unremoved with, for example, an etching solution failing to reach the metal during patterning of the thin metal wires. The bent wire 13 with a length of 20 µm or shorter can reduce moire resulting from, for example, interference with a black matrix in a display. More specifically, the bent wire 13 may have a length of 8 to 14 µm. The obtuse angle θ may be set greater than or equal to 90° and less than 180°.

The conductive sheet 1 can be manufactured using pattern printing of conductive ink on the transparent substrate 3, or by forming a metal film including a blackened layer on the transparent substrate 3 by sputtering or metal-foil transferring and then patterning with exposure and etching. When the transparent substrate 3 is patterned with exposure and etching, a metal film including a blackened layer may be formed on the opposite sides of the transparent substrate 3, and both the sides of the transparent substrate 3 may be patterned simultaneously.

As described above, the conductive sheet 1 according to the first embodiment includes the first bent wires 13 connecting the first obtuse angles θ facing one another. With the first bent wires 13, the first metal sides 14 and the second metal sides 15 can form angles larger than the acute angles formed by the first thin metal wires 11 and the second thin metal wires 12 intersecting with one another without such bent wires. This can prevent an increase in the metal areas at the intersections in which metal remains unremoved with an etching solution insufficiently reaching the metal during patterning of the thin metal wires. The first thin metal wires 11 and the second thin metal wires 12 in the conductive sheet 1 are thus less visible at the intersections.

The first metal sides 14 defining the first openings R have the same length. The second metal sides 15 defining the first openings R have the same length. The first metal sides 14 and the second metal sides 15 have the same length. Thin metal wires are thus arranged regularly on the first surface 3a of the transparent substrate 3. This can avoid visible patterns of thin metal wires resulting from differences between portions in which the thin metal wires have lower densities and portions in which the thin metal wires have higher densities.

In addition to all the metal sides having the same length, the first bent wires 13 connected to two ends of each of the first metal sides 14 or the second metal sides 15 are parallel to one another and have the same length. The first openings R thus all have the same shape, further reducing the design load of the first conductive pattern 10. Further, the first bent wires 13 having the same length are on the extensions from the first centerlines L of the first openings R, and the first metal sides 14, the second metal sides 15, and the bent wires 13 form right angles or obtuse angles alone. The thin metal wires thus do not form acute angles at the intersections between the first thin metal wires 11 and the second thin metal wires 12, preventing an increase in the metal areas at the intersections more effectively.

A second embodiment of the present invention will now be described with reference to FIGS. 5 to 7.

Second Embodiment

Figure 5:
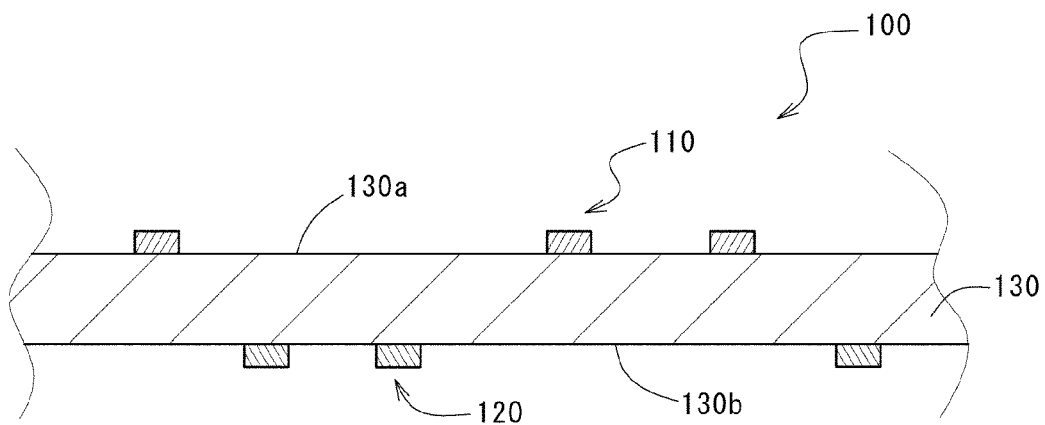
FIG. 5 is a schematic cross-sectional view of a conductive sheet 100 according to a second embodiment of the present invention.
Figure 8:
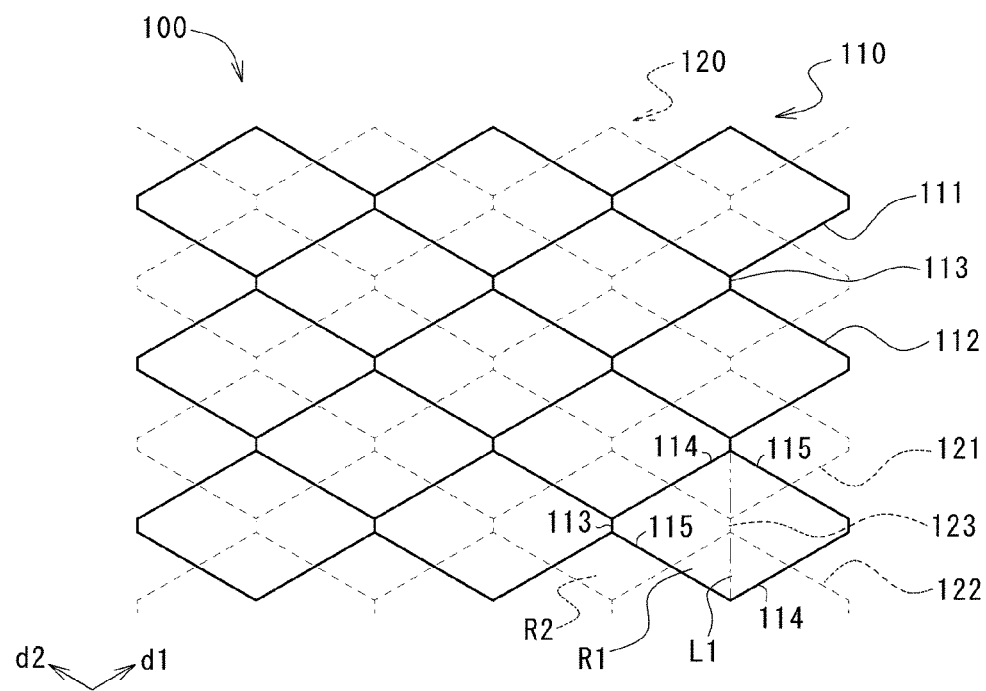
FIG. 8 is a schematic plan view of the conductive sheet 100 according to the second embodiment of the present invention.

As shown in FIG. 5, a conductive sheet 100 according to the second embodiment of the present invention includes a transparent substrate 130, a first conductive pattern 110 on a first surface 130a of the transparent substrate 130, and a second conductive pattern 120 on a second surface 130b of the transparent substrate 130. The first conductive pattern 110 and the second conductive pattern 120 shown in FIG. 8 are viewed in plan from the first surface 130a. In FIG. 8, the first conductive pattern 110 on the first surface 130a is indicated by the solid lines, and the second conductive pattern 120 on the second surface 130b by the dashed lines.

Figure 6:
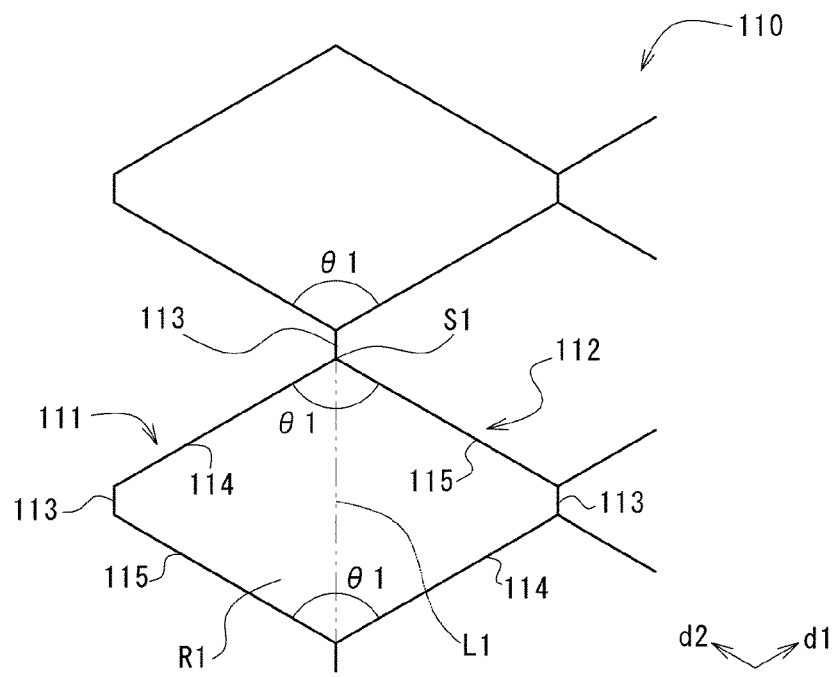
FIG. 6 is an enlarged partial plan view of the conductive sheet 100 according to the second embodiment of the present invention, showing a first conductive pattern 110.
Figure 7:
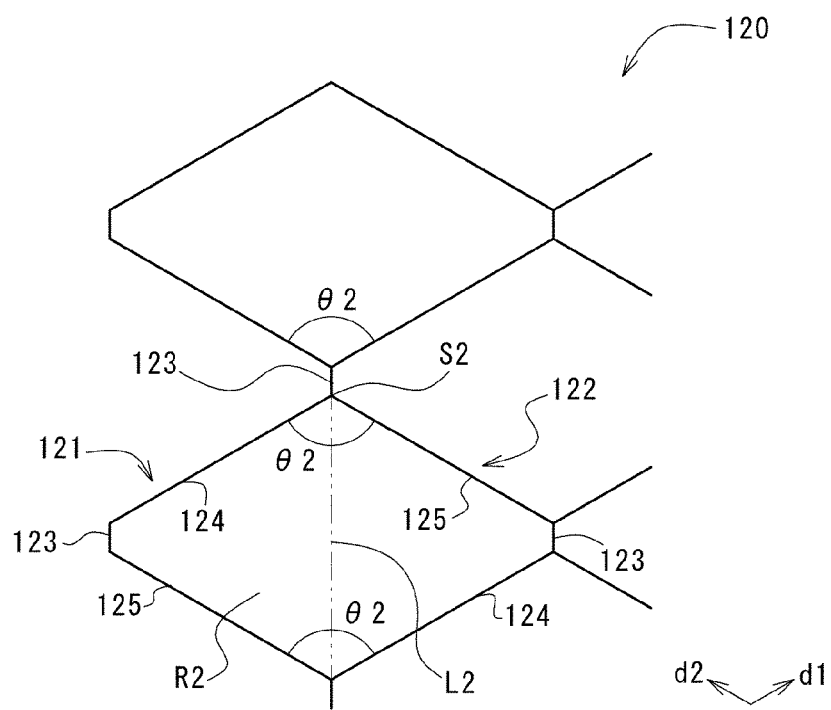
FIG. 7 is an enlarged partial plan view of the conductive sheet 100 according to the second embodiment of the present invention, showing a second conductive pattern 120.

Referring to FIGS. 6 and 7, the first conductive pattern 110 and the second conductive pattern 120 will now be described.

FIG. 6 is an enlarged partial plan view of a part of the first conductive pattern 110 viewed from the first surface 130a of the transparent substrate 130. First thin metal wires 111 extending in a first direction d1 and second thin metal wires 112 extending in a second direction d2 commonly include first bent wires 113 at their intersections. The first thin metal wires 111 and the second thin metal wires 112 commonly include a single first bent wire 113 at each of their intersections. The first thin metal wires 111 and the second thin metal wires 112 form first obtuse angles θ1. The first bent wires 113 each connect facing first obtuse angles θ1 to each other.

The first thin metal wires 111 include first metal sides 114 as thin metal wires each extending from one first bent wire 113 to an adjacent first bent wire 113. The second thin metal wires 112 include second metal sides 115 as thin metal wires each extending from one first bent wire 113 to an adjacent first bent wire 113. The first metal sides 114 and the second metal sides 115 each have two ends connected to the corresponding first bent wires 113. The first metal side 114 and the second metal side 115 form a first obtuse angle θ1. The first metal side 114 and the second metals side 115 intersect with each other at an intersection S1. The first metal side 114 and the second metal side 115 form the first obtuse angle θ1 with the intersection S1 as the center. Two first bent wires 113, two first metal sides 114, and two second metal sides 115 define each first opening R1. Multiple first openings R1 are arranged consecutively in the first direction d1 and the second direction d2 on the entire first surface 130a of the transparent substrate 130. Each first opening R1 includes two first obtuse angles θ1. An imaginary first centerline L1 extends through the two first obtuse angles θ and connects two first intersections S1.

The first metal side 114 and the second metal side 115 facing each other across the first bent wire 113 have the same length. Two first metal sides 114 and two second metal sides 115 defining each first opening R1 have the same length. Two first bent wires 113 connected to the two ends of each first metal side 114 are parallel to each other. Two first bent wires 113 connected to the two ends of each second metal side 115 are parallel to each other. Two first bent wires 113 defining a single first opening R1 are parallel to each other. A line segment connecting end points of the first metal side 114 and the second metal side 115 opposite to the intersection S1 is orthogonal to the first centerline L1. Each first bent wire 113 connects two first centerlines L1 and is on an extension from the first centerlines L1. The first opening R1 is line symmetric with respect to the corresponding first centerline L1. The first metal side 114 and the first bent wire 113 form a right angle or an obtuse angle. The second metal side 115 and the first bent wire 113 form a right angle or an obtuse angle.

FIG. 7 is an enlarged partial plan view of the conductive sheet 100, showing a part of the second conductive pattern 120 viewed from the first surface 130a of the transparent substrate 130. The second conductive pattern 120 includes multiple third thin metal wires 121 extending in a first direction d1 and arranged in a second direction d2, and multiple fourth thin metal wires 122 extending in the second direction d2 and arranged in the first direction d1. The third thin metal wires 121 and the fourth thin metal wires 122 intersect with one another to consecutively define multiple second openings R2 in the first direction d1 and the second direction d2 on the second surface 130b of the transparent substrate 130.

The third thin metal wires 121 extending in the first direction d1 and the fourth thin metal wires 122 extending in the second direction d2 commonly include second bent wires 123 at their intersections. The third thin metal wires 121 and the fourth thin metal wires 122 commonly include a single second bent wire 123 at each of their intersections. The third thin metal wires 121 and the fourth thin metal wires 122 form second obtuse angles θ2. The second bent wires 123 each connect facing second obtuse angles θ2 to each other.

The third thin metal wires 121 include third metal sides 124 as thin metal wires each extending from one second bent wire 123 to an adjacent second bent wire 123. The fourth thin metal wires 122 include fourth metal sides 125 as thin metal wires each extending from one second bent wire 123 to an adjacent second bent wire 123. The third metal sides 124 and the fourth metal sides 125 each have two ends connected to the corresponding second bent wires 123. The third metal side 124 and the fourth metal side 125 form the second obtuse angle θ2. The third metal side 124 and the fourth metal side 125 intersect with each other at an intersection S2. The third metal side 124 and the fourth metal side 125 form the second obtuse angle θ2 with the intersection S2 as the center. Two second bent wires 123, two third metal sides 124, and two fourth metal sides 125 define each second opening R2. The second openings R2 are arranged consecutively in the first direction and the second direction on the entire second surface 130b of the transparent substrate 130. Each second opening R2 includes two second obtuse angles θ2. An imaginary second centerline L2 extends through the two second obtuse angles θ2 and connects two intersections S2.

The third metal side 124 and the fourth metal side 125 facing each other across the first bent wire 123 have the same length. Two third metal sides 124 and two fourth metal sides 125 defining each second opening R2 have the same length. Two second bent wires 123 connected to the two ends of each third metal side 124 are parallel to each other. The two second bent wires 123 connected to the two ends of each fourth metal side 125 are parallel to each other. Two second bent wires 123 defining each second opening R2 are parallel to each other. A line segment connecting end points of the third metal side 124 and the fourth metal side 125 opposite to the intersection S2 is orthogonal to the second centerline L2. Each second bent wire 123 connects two second centerline L2 and is on an extension from the second centerlines L2. The second opening R2 is line symmetric with respect to the corresponding second centerline L2. The third metal side 124 and the second bent wire 123 form a right angle or an obtuse angle. The fourth metal side 125 and the second bent wire 123 form a right angle or an obtuse angle.

The first metal side 114 and the second metal side 115 have the same length as the third metal side 124 and the fourth metal side 125. The first bent wire 113 has the same length as the second bent wire 123. The first obtuse angle θ1 has the same angle as the second obtuse angle θ2. The first opening R1 thus have the same opening area as the second opening R2. The lengths of the metal sides and the bent wires and the angles of the obtuse angles may be set in the same manner as in the first embodiment.

Referring to FIG. 8, overlapping of the first conductive pattern 110 and the second conductive pattern 120 will now be described.

The multiple third thin metal wires 121 included in the second conductive pattern 120 are arranged in the second direction d2 without overlapping the first thin metal wires 111. Similarly, the multiple fourth thin metal wires 122 are arranged in the first direction d1 without overlapping the second thin metal wires 112. The first thin metal wires 111 and the third thin metal wires 121 both extend in the first direction d1. The second thin metal wires 112 and the fourth thin metal wires 122 both extend in the second direction d2.

The first conductive pattern 110 and the second conductive pattern 120 are arranged to have the second bent wires 123 in the second conductive pattern 120 at the centers of the first openings R1 in the first conductive pattern 110. The second bent wires 123 at the centers of the first openings R1 are located at the middles of the first centerlines L1 of the first openings R1 to overlap the first centerlines L1.

With the first openings R1 and the second openings R2 having the same opening area, the first bent wires 113 are located in the same manner. The first bent wires 113 in the first conductive pattern 110 are at the centers of the second openings R2 in the second conductive pattern 120. The first bent wires 113 at the centers of the second openings R2 are located at the middles of the second centerlines L2 of the second openings R2 to overlap the second centerlines L2.

As described above, the conductive sheet 100 according to the second embodiment includes the second bent wires 123 connecting the second obtuse angles θ2 facing one another. The third metal sides 124 and the fourth metal sides 125 can thus form larger angles with the second bent wires 123 than when the third thin metal wires 121 and the fourth thin metal wires 122 intersect with one another without bent wires. This can prevent an increase in the metal areas at the intersections in which metal remains unremoved with an etching solution insufficiently reaching the metal during patterning of the thin metal wires. The thin metal wires in the conductive sheet are thus less visible at the intersections on the second surface 130b in addition to the first surface 130a of the transparent substrate 130.

The first metal side 114 and the second metal side 115 have the same length as the third metal side 124 and the fourth metal side 125. The first bent wire 113 has the same length as the second bent wire 123. The first opening R1 thus has the same opening area as the second opening R2. The transparent substrate 130 can thus include the same conductive pattern on the opposite sides, reducing the design load of the conductive pattern.

The first conductive pattern 110 and the second conductive patterns 120 are arranged to have the second bent wires 123 at the centers of the first openings R1, or in other words, to have the first bent wires 113 at the centers of the second openings R2. The thin metal wires are thus arranged regularly as viewed from the first surface 130a of the transparent substrate 130. This can avoid visible patterns of the thin metal wires resulting from differences in their densities.

Figure 9A:
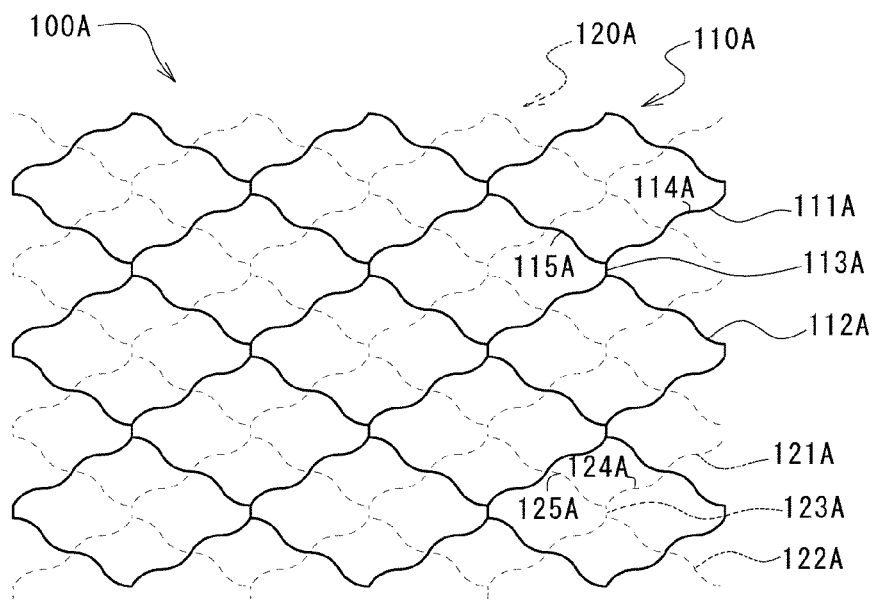
FIG. 9A is a schematic plan view of a conductive sheet 100A according to modification A of the second embodiment.
Figure 10:
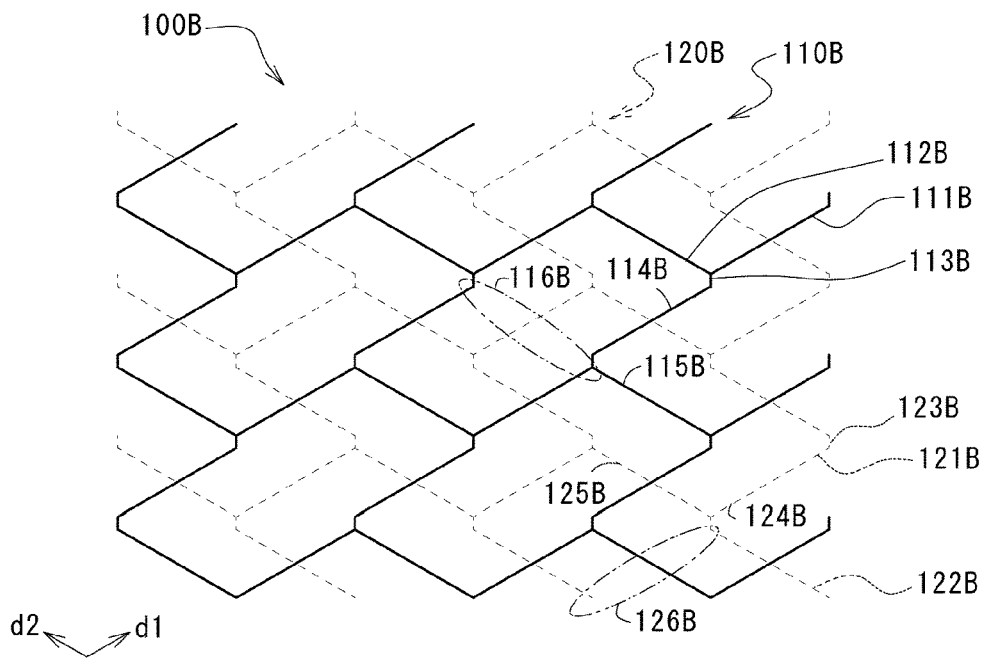
FIG. 10 is a schematic plan view of a conductive sheet 100B according to modification B of the second embodiment.
Figure 11:
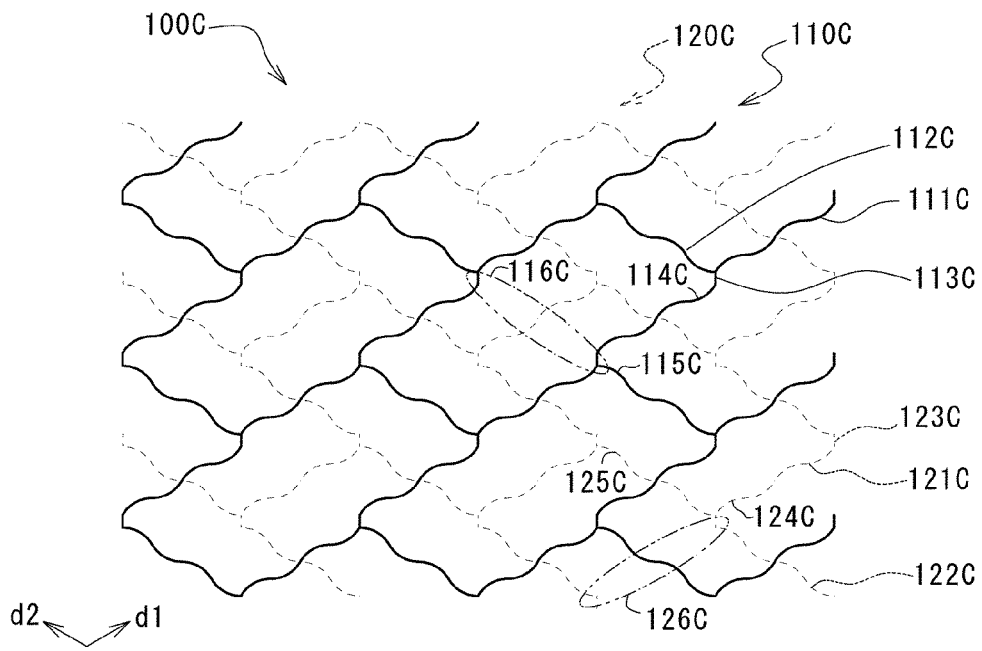
FIG. 11 is a schematic plan view of a conductive sheet 100C according to modification C of the second embodiment.

In the second embodiment described above, the metal sides are straight. However, the metal sides may not be straight. Referring to FIGS. 9 to 11, modifications A to C will now be described. In FIGS. 9A to 11, the first conductive pattern on the first surface of the transparent substrate is indicated by the solid lines, and the second conductive pattern on the second surface by the dashed lines. The conductive sheets according to the modifications will be described below focusing on differences from the conductive sheet according to the second embodiment.

Modification A

Figure 9B:
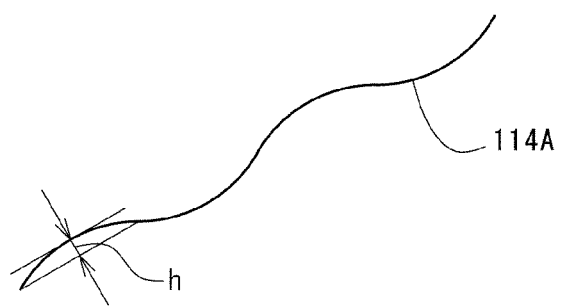
FIG. 9B is an enlarged partial plan view of the conductive sheet 100A according to modification A of the second embodiment, showing a first metal side 114A.

Referring to FIGS. 9A and 9B, a conductive sheet 100A according to modification A will be described.

The conductive sheet 100A includes a transparent substrate, a first conductive pattern 110A on a first surface of the transparent substrate, and a second conductive pattern 120A on a second surface of the transparent substrate. The first conductive pattern 110A and the second conductive pattern 120A shown in FIG. 9A are viewed in plan from the first surface.

In modification A, metal sides are wavy lines with arcs consecutively alternating with crests and troughs. In the first conductive pattern 110A, each metal side includes four arcs consecutively alternating with crests and troughs. A set of an arc crest and an arc trough is referred to as one period. First metal sides 114A and second metal sides 115A are wavy lines each having a length of two periods. The same applies to third metal sides 124A and fourth metal sides 125A.

The conductive sheet 100A according to modification A can reduce, in addition to avoiding visible thin metal wires at the intersections as in the above embodiments, beams of light caused by light incident from a point light source, such as sunlight, diffracted by the thin metal wires, and thus can reduce glares.

As shown in FIG. 9B, when a straight line (string length) extends from the start point to the end point of one arc in a metal side and the distance from the straight line to the peak of the arc is defined as an arrow height h, the relationship between the arrow height h and the arc radius r may be $0.07 < h/r \leq 0.4$. At the h/r of 0.4 or less, the resistance of the thin metal wires is less likely to increase unintendedly, and the response speed is thus maintained appropriately. At the h/r of 0.07 or greater, beams of light can be reduced more effectively.

Modification B

Referring to FIG. 10, a conductive sheet 100B according to modification B will be described.

The conductive sheet 100B includes a transparent substrate, a first conductive pattern 110B on a first surface of the transparent substrate, and a second conductive pattern 120B on a second surface of the transparent substrate. The first conductive pattern 110B and the second conductive pattern 120B shown in FIG. 10 are viewed in plan from the first surface.

The first conductive pattern 110B includes multiple first thin metal wires 111B and multiple second thin metal wires 112B. The first thin metal wires 111B and the second thin metal wires 112B commonly include first bent wires 113B at their intersections. The first thin metal wires 111B include first metal sides 114B as thin metal wires each extending from one first bent wire 113B to an adjacent first bent wire 113B. The second thin metal wires 112B include second metal sides 115B as thin metal wires each extending from one first bent wire 113B to an adjacent first bent wire 113B, and first disconnected portions 116B each including no thin metal wire between one first bent wire 113B and an adjacent first bent wire 113B. The second thin metal wires 112B alternately include the second metal sides 115B and the first disconnected portions 116B.

The second conductive pattern 120B includes multiple third thin metal wires 121B and multiple fourth thin metal wires 122B. The third thin metal wires 121B and the fourth thin metal wires 122B commonly include second bent wires 123B at their intersections. The third thin metal wires 121B include third metal sides 124B as thin metal wires each extending from one second bent wire 123B to an adjacent second bent wire 123B, and second disconnected portions 126B each including no thin metal wire between one second bent wires 123B and an adjacent second bent wires 123B. The third metal sides 124B and the second disconnected portions 126B alternate with one another. The fourth thin metal wires 122B include fourth metal sides 125B each extending from one second bent wire 123B to an adjacent second bent wire 123B. The first disconnected portions 116B and the second disconnected portions 126B do not intersect with one another.

The conductive sheet 100B according to modification B can include the first disconnected portions 116B and the second disconnected portions 126B varying patterns without the thin metal wires having nonuniform densities. In addition to avoiding visible thin metal wires at the intersections, this structure can avoid visible patterns of thin metal wires resulting from differences in their densities and can reduce moire caused by interference with a black matrix in a display when the conductive sheet 100B is used for, for example, electrodes in a touch sensor.

Modification C

Referring to FIG. 11, a conductive sheet 100C according to modification C will be described.

The conductive sheet 100C includes a transparent substrate, a first conductive pattern 110C on a first surface of the transparent substrate, and a second conductive pattern 120C on a second surface of the transparent substrate. The first conductive pattern 110C and the second conductive pattern 120C shown in FIG. 11 are viewed in plan from the first surface.

In modification C, metal sides are wavy lines as in modification A. In the first conductive pattern 110C, each metal side includes four arcs consecutively alternating with crests and troughs. A set of an arc crest and an arc trough is referred to as one period. First metal sides 114C and second metal sides 115C are wavy lines each having a length of two periods. The same applies to the second conductive pattern 120C. The conductive sheet 100C further includes disconnected portions as in modification B. Second thin metal wires 112C include the second metal sides 115C and first disconnected portions 116C alternating with one another. Third thin metal wires 121C include third metal sides 124C and second disconnected portions 126C alternating with one another.

The conductive sheet 100C according to modification C includes the wavy metal sides to reduce beams of light, and the disconnected portions varying patterns without the thin metal wires having nonuniform densities. The conductive sheet can reduce, in addition to avoiding visible thin metal wires at the intersections, visible thin metal wire patterns, moire, and glares caused by beams of light.

A third embodiment of the present invention will now be described with reference to FIGS. 12 and 13.

Third Embodiment

Figure 12:
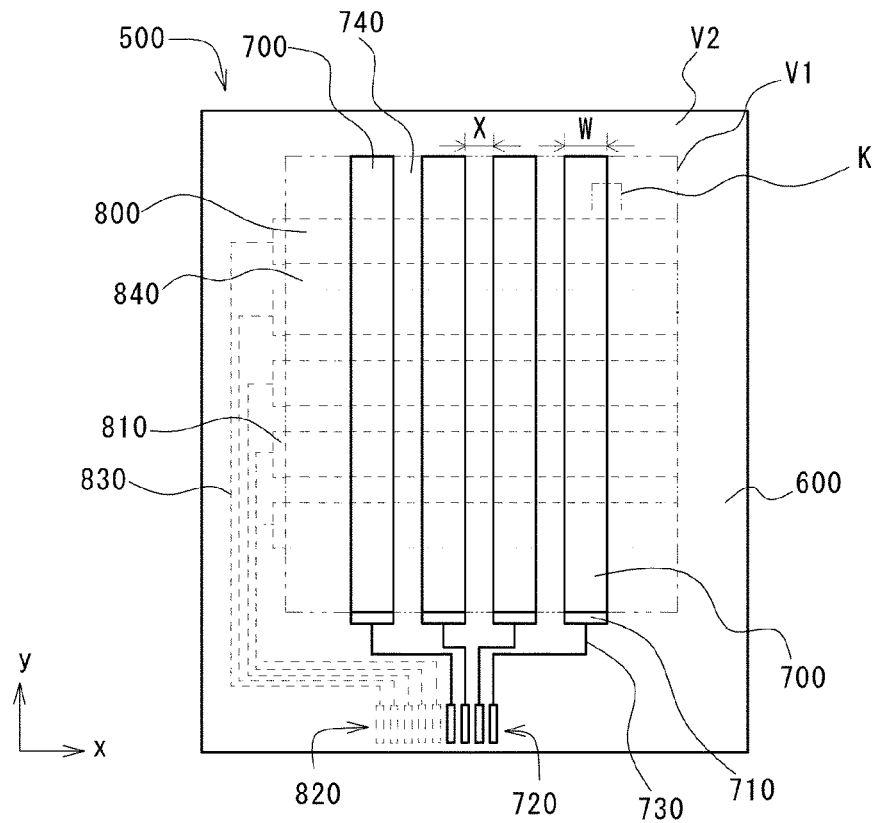
FIG. 12 is a schematic plan view of a touch sensor 500 according to a third embodiment of the present invention.
Figure 13:
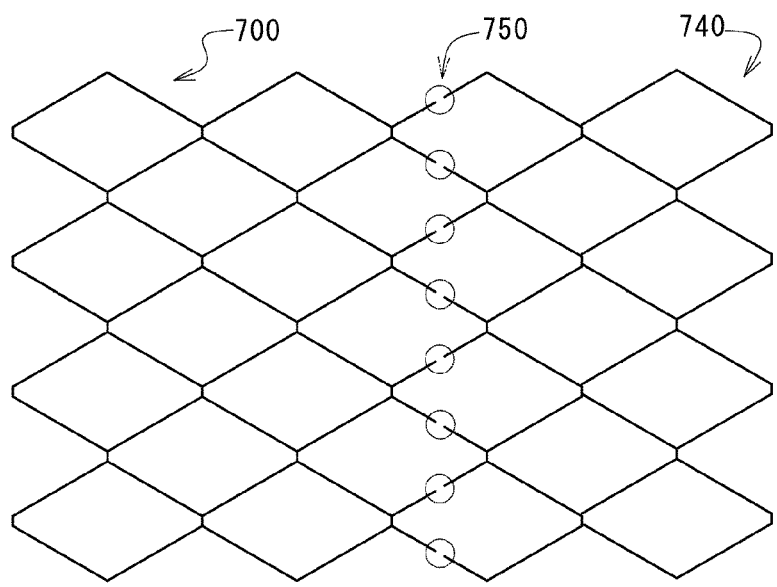
FIG. 13 is an enlarged partial plan view of an area K in FIG. 12 in the touch sensor 500 according to the third embodiment of the present invention.

As shown in FIG. 12, a touch sensor 500 according to the third embodiment of the present invention includes a transparent substrate 600, multiple first electrodes 700 on a first surface of the transparent substrate 600, first connectors 710 each located at an end of the corresponding first electrode 700, first terminals 720 connected to external wiring, and first routing wires 730 connecting the first connectors 710 to the first terminals 720. The touch sensor 500 further includes multiple second electrodes 800 on a second surface of the transparent substrate 600, second connectors 810 each located at an end of the corresponding second electrode 800, second terminals 820 connected to external wiring, and second routing wires 830 connecting the second connectors 810 to the second terminals 820. In FIG. 12, the electrodes and other components on the first surface of the transparent substrate 600 are indicated by the solid lines, and the electrodes and other components on the second surface of the transparent substrate 600 are indicated by the dashed lines.

The first surface of the transparent substrate 600 includes an operation area V1 and a peripheral area V2. In the operation area V1 in the touch sensor 500, input operations are performed by a user. The peripheral area V2 is to be covered with, for example, a frame-shaped decorative layer in a cover substrate after assembly. The operation area V1 on the first surface of the transparent substrate 600 includes the multiple first electrodes 700 and first dummy portions 740. The peripheral area V2 includes the first connectors 710, the first terminals 720, and the first routing wires 730.

The multiple first electrodes 700 are in the operation area V1. The first electrodes 700 are four strips extending in y-direction and aligned in x-direction on the first surface of the transparent substrate 600. The first electrodes 700 each include the first conductive pattern 110 described in the second embodiment. The first electrodes 700 are electrodes in the touch sensor.

The first electrodes 700 may have any size determined as appropriate for the size and the resolution of the operation area V1. However, W/A may be an integer greater than or equal to two, where A is the pitch of the first openings R1 included in the first conductive pattern 110 (the length of a line segment connecting two adjacent first bent wires 113 included in each first opening R1 and orthogonal to L1) and W is the width of the first electrodes 700. The touch sensor with this structure can maintain, when any portion of the thin metal wires is disconnected, the conduction between the electrodes and thus can maintain the operation of the touch sensor. Further, the first electrodes 700 may have the same width W to have W/A being an integer greater than or equal to two and X/A being an integer greater than or equal to zero, where X is the width of the first dummy portions 740. The touch sensor with this structure can include the electrodes each including the thin metal wires having the same area and thus can operate appropriately with no resistance variation among the electrodes.

The first dummy portions 740 are located in portions without the multiple first electrodes 700 in the operation area V1. The first electrodes 700 and the first dummy portions 740 are arranged alternately. The first dummy portions 740 each include, similarly to the first electrodes 700, the first conductive pattern 110 described in the second embodiment. In FIG. 13 showing an enlarged view of area K in FIG. 12, the first electrodes 700 and the first dummy portions 740 are electrically disconnected to one another with first boundary portions 750. The first boundary portions 750 are partial disconnections in the thin metal wires included in the first electrodes 700 to separate the first electrodes 700 from the first dummy portions 740. All the thin metal wires on the boundaries between the first electrodes 700 and the first dummy portions 740 are disconnected to define the first boundary portions 750. The first boundary portions 750 align in y-direction. The first boundary portions 750 may each have a width of 1 to 20 µm. The first boundary portions 750 with the disconnection width in this range can avoid visible boundaries between the first electrodes and the first dummy portions resulting from any or no thin metal wires being present. To form the disconnections of the first boundary portions 750, ends of the thin metal wires may be disconnected at right angles. When the thin metal wires extending obliquely are disconnected in a direction parallel to the y-axis, ends of the disconnected thin metal wires may have acute angles and reduce the accuracy of etching during manufacturing. The first boundary portions 750 may be the disconnections at the midpoints of the first metal sides and the second metal sides.

The first connectors 710 connect the first electrodes 700 to the first routing wires 730. The first connectors 710 each allow the first conductive pattern 110 included in the first electrode 700 to be collectively connected to the corresponding first routing wire 730. The first connectors 710 are rectangles each located at one end of the corresponding strip-shaped first electrode 700 in the longitudinal direction. The first connectors 710 partially overlap, in the peripheral area V2, the first conductive patterns 110 included in the first electrodes 700. The first electrodes 700 extend to the boundaries of the operation area V1, with a side of each rectangular first connectors 710 overlapping the boundary between the operation area V1 and the peripheral area V2. The first connectors 710 have the same width as the first electrodes 700. The first connectors 710 each include, similarly to the first thin metal wires 111 and the second thin metal wires 112, a film stack including a first blackened layer, a metal layer, and a second blackened layer stacked together in this order on the transparent substrate 600.

The first terminals 720 connect the external wiring such as a flexible wiring board to the touch sensor 500 and are located near an outer edge of the transparent substrate 600. The first routing wires 730 connect the first electrodes 700 to the first terminals 720 and extend, while bending in intermediate portions, toward the middle of the outer edge of the transparent substrate 600 to be connected to the first terminals 720. The first terminals 720 and the first routing wires 730 each include, similarly to the first thin metal wires 11 and the second thin metal wires 12, a first blackened layer, a metal layer, and a second blackened layer stacked together in this order on the transparent substrate 600.

Similarly, an operation area V1 on the second surface of the transparent substrate 600 includes the multiple second electrodes 800 and second dummy portions 840. A peripheral area V2 includes the second connectors 810, the second terminals 820, and the second routing wires 830. The second electrodes 800 are five strips extending in x-direction and aligned in y-direction on the second surface of the transparent substrate 600. The second connectors 810 are each located at one end of the corresponding strip-shaped second electrode 800 in the longitudinal direction. The second electrodes 800 each include the second conductive pattern 120 described in the second embodiment. The second electrodes 800 are electrodes in the touch sensor.

The first terminals 720 on one side of the transparent substrate 600 and the second terminals 820 on the other side of the transparent substrate 600 are connected to a flexible printed circuit board (not shown). The flexible printed circuit board is connected to a controller that detects a touch with a capacitance method. The controller detects an electric current that flows in response to a change in capacitance generated in the first electrodes 700 and the second electrodes 800 when a conductor such as a finger of the user or a stylus moves closer to or away from the first electrodes 700 and the second electrodes 800, and can thus detect a touch operation performed by the user and the touch position.

A method for manufacturing the touch sensor 500 will be described.

A first blackened film layer, a metal film layer, and a second blackened film layer are formed in this order on the opposite sides of the transparent substrate 600 by sputtering or metal foil transfer. A resist layer is then formed on the second blackened film layer and patterned by exposure and developing using a pattern mask. Using the patterned resist layer as an etching mask, the first blackened film layer, the metal film layer, and the second blackened film layer are then etched to simultaneously form the electrodes, the dummy portions, the connectors, the terminals, and the routing wires patterned as the conductive patterns on the opposite sides of the transparent substrate 600.

As described above, the touch sensor 500 according to the third embodiment includes the first electrodes 700 in the second embodiment each including the first conductive pattern and the second electrodes 800 in the second embodiment each including the second conductive pattern, and thus their thin metal wires are less visible at the intersections. The touch sensor 500 thus has an improved appearance.

The operation area V1 includes the dummy portions in portions without the electrodes and thus allows the electrode patterns, which may be visible due to any or no electrodes being present, to be less visible to the operator. The dummy portions are patterned as the first conductive patterns and the second conductive patterns in the second embodiment, similarly to the electrodes, and thus allow the thin metal wire patterns to be less visible at the intersections in both the dummy portions and the electrodes. The operation area V1 in the touch sensor 500 can thus have an improved appearance. The method for manufacturing the touch sensor 500 according to the third embodiment further allows the electrodes, the dummy portions, the connectors, the terminals, and the routing wires to be simultaneously formed on the opposite sides of the transparent substrate 600, and can thus prevent the manufacturing processes from being complicated.

In the above embodiments, the first metal side and the second metal side have the same length, but may have different lengths. With the first metal side and the second metal side having different lengths, the openings may have different sizes. To avoid visible patterns of the thin metal wires resulting from differences in their densities, one of the first metal side or the second metal side may have the length one to two times the length of the other. The same applies to the third metal side and the fourth metal side.

Further, the first metal sides adjacent to each other across the bent wire may have different lengths. In this case, one first metal side may have a length one to two times the length of the adjacent first metal side. The same applies to the second metal side to the fourth metal side.

In the above embodiments, the first bent wires and the second bent wires all have the same length, but may have different lengths. The first bent wires may have different lengths, or the second bent wires may have different lengths.

In the above embodiments, the bent wires connected to the two ends of each metal side are parallel to each other, but may not be parallel to each other. In the first embodiment, for example, the first bent wires 13 are on the extensions from L1, but may be inclined in the first direction d1 or the second direction d2. Further, the first bent wires 13 may be curved. In this case, the first bent wires 13 and the first metal sides 14 or the second metal sides 15 may form angles greater than or equal to 90° to avoid an increase in the metal areas at the intersections of the thin metal wires caused by, for example, an etching solution spreading insufficiently. The same applies to the other embodiments.

In the above embodiments, the first conductive pattern and the second conductive pattern overlap each other to have the bent wires at the centers of the openings, but may overlap in other manners. With the first conductive pattern and the second conductive pattern overlapping each other, the metal sides included in the first conductive pattern and the metal sides included in the second conductive pattern intersect with one another. The metal sides may intersect with one another at positions at which one metal side is divided by the other metal side at the ratio of 1:1 to 2:1 to prevent the metal sides and the bent wires from being too close to one another or the bent wires from being too close to one another.

In the above embodiments, the thin metal wires are each a stack of the first blackened layer, the metal layer, and the second blackened layer stacked in this order, but may have another stacked structure. For example, the thin metal wires may each include the metal layer alone or be a stack of the metal layer and the blackened layer stacked in this order on the transparent substrate. The blackened layer may cover the upper surface and the side surfaces of the metal layer on the transparent substrate. The blackened layer may cover the entire surface of the metal layer.

In the above embodiments, the second metal sides and the first disconnected portions alternate with one another, and the third metal sides and the second disconnected portions alternate with one another. However, the disconnected portions may be arranged differently. To avoid nonuniform densities in the thin metal wires, the disconnected portions may be arranged to prevent the first disconnected portions and the second disconnected portions from intersecting with one another.

The metal sides in the above embodiments are straight or wavy, but may have other shapes. For example, the metal sides may be zigzag or bent.

In the above embodiments, the electrodes are strips, but may have other shapes. Other shapes of the electrodes include, for example, a series of rhomboids with their vertices connected to one another or a comb shape. The electrodes may be in any number. The routing wires and the terminals may be positioned differently.

In the above embodiments, the dummy portions are patterned as the conductive patterns in the second embodiment, but may be patterned as other thin metal wire patterns. The dummy portions may be patterned as a thin metal wire pattern that allows the thin metal wires to be less visible at the intersections.

In the above embodiments, the touch sensor 500 includes the electrodes on the opposite sides of the transparent substrate 600, but may have a different structure. The touch sensor 500 may include two transparent substrates each including the electrodes on one side and attached together to have the other sides facing each other, or to have the sides with the electrodes facing each other with an adhesive layer in between. One transparent substrate may be attached to the other transparent substrate with its side including the electrodes overlapping the side of the other transparent substrate without the electrodes.

In the above embodiments, the connectors are each located at one end of the electrode, but may be at the two ends of the electrode in the longitudinal direction. For example, the second electrode 800 may include the second connector 810 on its right end, in addition to the second connector 810 on its left end. In this case, the second terminals 820 may also be located on the right of the first terminal 720, and each second routing wire 830 is connected to the corresponding second terminal 820. The terminals may be positioned differently, and the routing wires may be arranged differently.

In the above embodiments, the electrodes, the dummy portions, the connectors, the terminals, and the routing wires are formed simultaneously. However, the touch sensor 500 may be manufactured with a different method. For example, the boundary portions may be formed, after the thin metal wires in the first embodiment are formed in the operation area V1, by disconnecting the thin metal wires with a laser, and then the electrodes and the dummy portions may be formed. The electrodes and the dummy portions may be formed in the operation area V1, and then the connectors, the terminals, and the routing wires may be formed in the peripheral area V2. The components may be formed on one side of the transparent substrate 600 at a time, instead of being simultaneously formed on the opposite sides.

In the above embodiments, the conductive sheet is used as electrodes in a touch sensor, but may have another use. For example, the conductive sheet according to the embodiments of the present invention may be used in an antenna or a heater.

REFERENCE SIGNS LIST 1, 100 conductive sheet
3, 130, 600 transparent substrate
10, 110 first conductive pattern
11, 111 first thin metal wire
12, 112 second thin metal wire
13, 113 first bent wire
14, 114 first metal side
15, 115 second metal side
20, 120 second conductive pattern
21, 121 third thin metal wire
22, 122 fourth thin metal wire
23, 123 second bent wire
24, 124 third metal side
25, 125 fourth metal side
500 touch sensor
700 first electrode
800 second electrode
710 first connector
810 second connector
720 first terminal
820 second terminal
730 first routing wire
830 second routing wire
740 first dummy portion
840 second dummy portion

The invention claimed is:

1. A conductive sheet, comprising:
a transparent substrate; and
a first conductive pattern on a surface of the transparent substrate, the first conductive pattern including a plurality of first thin metal wires extending in a first direction and a plurality of second thin metal wires extending in a second direction, the plurality of second thin metal wires intersecting with the plurality of first thin metal wires, to form a plurality of first intersections, each first intersection forming a first obtuse angle,
the first conductive pattern further including a plurality of first bent wires, at least one first bent wire connecting at least one first thin metal wire and at least one second thin metal wire, the first thin metal wire, the first bent wire, and the second metal wire forming a first connection, the first connection comprising a first pair of two obtuse angles, and
at least one of the plurality of first bent wires connecting two facing first obtuse angles formed by two of the plurality of first intersections,
each of the plurality of first thin metal wires and
each of the plurality of second thin metal wires
having a same length of 300 μm to 1300 μm, and
each of the plurality of first bent wires being parallel to at least one other of the plurality of first bent wires and each of the first bent wires having a length of 8 μm to 20 μm,
the plurality of first thin metal wires, the plurality of second thin metal wires, and the plurality of first bent wires comprising a mesh comprising first openings, at least a plurality of the first openings (i) having the same shape as one another and (ii) being arranged consecutively in the first direction and the second direction.

2. The conductive sheet according to claim 1, further comprising:
a second conductive pattern on another surface of the transparent substrate, the second conductive pattern including a plurality of third thin metal wires extending in the first direction without overlapping the plurality of first thin metal wires and a plurality of fourth thin metal wires extending in the second direction, the plurality of fourth thin metal wires intersecting with the plurality of third thin metal wires without overlapping the plurality of second thin metal wires, to form a plurality of second intersections, each second intersection forming a second obtuse angle,
the second conductive pattern further including a plurality of second bent wires, at least one second bent wire connecting at least one third thin metal wire and at least one fourth thin metal wire, the third thin metal wire, the second bent wire, and the fourth metal wire forming a second connection, the second connection comprising a second pair of two obtuse angles,
at least one of the plurality of second bent wires connecting two facing second obtuse angles formed by two of the plurality of second intersections, and
the plurality of third thin metal wires, the plurality of fourth thin metal wires, and the plurality of second bent wires comprising a mesh comprising second openings, at least plurality of the second openings (i) having the same shape as one another and (ii) being arranged consecutively in the first direction and the second direction.

3. The conductive sheet according to claim 2, wherein each of the plurality of third thin metal wires and each of the plurality of fourth thin metal wires has a same length of 300 μm to 1300 μm.

4. The conductive sheet according to claim 2, wherein each of the plurality of second bent wires is parallel to at least one other of the plurality of second bent wires and each of the second bent wires has a length of 8 μm to 20 μm.

5. The conductive sheet according to claim 2, wherein each of the plurality of second bent wires is at a center of a corresponding first opening of the plurality of first openings.

6. The conductive sheet according to claim 2, wherein each of the plurality of second thin metal wires includes a plurality of first disconnected portions each including no thin metal wire between a first bent wire and an adjacent first bent wire of the plurality of first bent wires, each of the plurality of third thin metal wires includes a plurality of second disconnected portions each including no thin metal wire between a second bent wire and an adjacent second bent wire of the plurality of second bent wires, and the plurality of first disconnected portions have no intersection with the plurality of second disconnected portions.

7. The conductive sheet according to claim 6, wherein each of the plurality of second thin metal wires includes a plurality of second connected portions and the plurality of first disconnected portions arranged alternately, and each of the plurality of third thin metal wires includes a plurality of third connected portions and the plurality of second disconnected portions arranged alternately.

8. A touch sensor, comprising:

the conductive sheet according to claim 2, the conductive sheet including a plurality of the first conductive patterns serving as a plurality of first electrodes and a plurality of the second conductive patterns serving as a plurality of second electrodes, the conductive sheet including a plurality of first connectors on ends of the plurality of first electrodes and a plurality of second connectors on ends of the plurality of second electrodes;

a terminal connectable to external wiring; and routing wiring connecting the plurality of first connectors and the plurality of second connectors to the terminal.

9. The conductive sheet according to claim 2, wherein each of the plurality of second openings has a hexagonal shape, the hexagonal shape being defined by two of the plurality of third thin metal wires, two of the plurality of fourth thin metal wires, and two of the plurality of second bent wires.

10. The conductive sheet according to claim 1, wherein the plurality of first thin metal wires include a first blackened layer on a first side of a metal layer and a second blackened layer on a second side of the metal layer opposite the first side.

11. The conductive sheet according to claim 1, wherein each of the plurality of second thin metal wires includes a plurality of first disconnected portions, each including no thin metal wire between the first bent wire and the adjacent first bent wire of the plurality of first bent wires.

12. The conductive sheet according to claim 1, wherein each of the plurality of first openings has a hexagonal shape, the hexagonal shape being defined by two of the plurality of first thin metal wires, two of the plurality of second thin metal wires, and two of the plurality of first bent wires.

13. A method for manufacturing a touch sensor, the method comprising:

sequentially forming a first blackened film layer, a metal film layer, and a second blackened film layer on opposite surfaces of a transparent substrate; and simultaneously forming, on a first surface of the transparent substrate, a plurality of first electrodes each including a first conductive pattern, a plurality of first connectors on ends of the plurality of first electrodes, a first terminal connectable to external wiring, and first routing wiring connecting the plurality of first connectors and the first terminal, and, on a second surface of the transparent substrate, a plurality of second electrodes each including a second conductive pattern, a plurality of second connectors on ends of the plurality of second electrodes, a second terminal connectable to external wiring, and second routing wiring connecting the plurality of second connectors and the second terminal, the first conductive pattern including a plurality of first thin metal wires extending in a first direction and a plurality of second thin metal wires extending in a second direction, the plurality of second thin metal wires intersecting with the plurality of first thin metal wires, to form a plurality of first intersections, each first intersection forming a first obtuse angle, the second conductive pattern including a plurality of third thin metal wires extending in the first direction without overlapping the plurality of first thin metal wires and a plurality of fourth thin metal wires extending in the second direction, the plurality of fourth thin metal wires intersecting with the plurality of third thin metal wires without overlapping the plurality of second thin metal wires, to form a plurality of second intersections, each second intersection forming a second obtuse angle, the first conductive pattern further including a plurality of first bent wires, at least one first bent wire connecting at least one first thin metal wire and at least one second thin metal wire, the first thin metal wire, the first bent wire, and the second metal wire forming a first connection, the first connection comprising a first pair of two obtuse angles, at least one of the plurality of first bent wires connecting two facing first obtuse angles formed by two of the plurality of first intersections, the second conductive pattern further including a plurality of second bent wires, at least one second bent wire connecting at least one third thin metal wire and at least one fourth thin metal wire, the third thin metal wire, the second bent wire, and the fourth metal wire forming a second connection, the second connection comprising a second pair of two obtuse angles, and at least one of the plurality of second bent wires connecting two facing second obtuse angles formed by two of the plurality of second intersections, each of the plurality of first thin metal wires and each of the plurality of second thin metal wires having a same length of 300 μm to 1300 μm, each of the plurality of first bent wires is parallel to at least one other of the plurality of first bent wires and each of the first bent wires having a length of 8 μm to 20 μm, and the plurality of first thin metal wires, the plurality of second thin metal wires, and the plurality of first bent wires comprising a mesh comprising first openings, at least a plurality of the first openings (i) having the same shape as one another and (ii) being arranged consecutively in the first direction and the second direction.

14. The method according to claim 13, wherein each of the plurality of third thin metal wires and each of the plurality of fourth thin metal wires have a same length of 300 to 1300 μm.

15. The method according to claim 13, wherein each of the plurality of second bent wires is parallel to at least one other of the plurality of second bent wires and each of the second bent wires has a length of 8 μm to 20 μm.

16. The method according to claim 13, wherein each of the plurality of second thin metal wires includes a plurality of first disconnected portions each including no thin metal wire between a first bent wire and an adjacent first bent wire of the plurality of first bent wires and each of the plurality of third thin metal wires includes a plurality of second disconnected portions each including no thin metal wire between a second bent wire and an adjacent second bent wire of the plurality of second bent wires.

17. The method according to claim 16, wherein the plurality of first disconnected portions have no intersection with the plurality of second disconnected portions.

18. The method according to claim 13, wherein each of the plurality of first openings has a hexagonal shape, the hexagonal shape being defined by two of the plurality of first thin metal wires, two of the plurality of second thin metal wires, and two of the plurality of first bent wires.

19. A conductive sheet, comprising:

a transparent substrate;

a first conductive pattern on a surface of the transparent substrate, the first conductive pattern including a plurality of first thin metal wires extending in a first direction and a plurality of second thin metal wires extending in a second direction and intersecting with the plurality of first thin metal wires, the plurality of first thin metal wires and the plurality of second thin metal wires being in a mesh with a plurality of first openings arranged consecutively in the first direction and the second direction; and a second conductive pattern on another surface of the transparent substrate, the second conductive pattern including a plurality of third thin metal wires extending in the first direction without overlapping the plurality of first thin metal wires and a plurality of fourth thin metal wires extending in the second direction and intersecting with the plurality of third thin metal wires without overlapping the plurality of second thin metal wires, the plurality of third thin metal wires and the plurality of fourth thin metal wires being in a mesh with a plurality of second openings arranged consecutively in the first direction and the second direction, the plurality of first thin metal wires and the plurality of second thin metal wires commonly including a plurality of first bent wires at intersections of the plurality of first thin metal wires and the plurality of second thin metal wires, the plurality of first bent wires connecting facing first obtuse angles formed by the plurality of first thin metal wires and the plurality of second thin metal wires, each of the plurality of first thin metal wires includes a first metal side extending from the first bent wire to a first adjacent first bent wire of the plurality of first bent wires, each of the plurality of second thin metal wires includes a second metal side extending from the first bent wire to a second adjacent first bent wire of the plurality of first bent wires, the plurality of third thin metal wires and the plurality of fourth thin metal wires commonly including a plurality of second bent wires at intersections of the plurality of third thin metal wires and the plurality of fourth thin metal wires, the plurality of second bent wires connecting facing obtuse angles formed by the plurality of third thin metal wires and the plurality of fourth thin metal wires, each of the plurality of third thin metal wires includes a third metal side extending from the second bent wire to a first adjacent second bent wire of the plurality of second bent wires, each of the plurality of fourth thin metal wires includes a fourth metal side extending from the second bent wire to a second adjacent second bent wire of the plurality of second bent wires, each of the plurality of second thin metal wires including a plurality of first disconnected portions, each first disconnected portion including no thin metal wire between a first bent wire and an adjacent first bent wire of the plurality of first bent wires, each of the plurality of second thin metal wires includes a plurality of the second metal sides and the plurality of first disconnected portions arranged alternately, each of the plurality of third thin metal wires including a plurality of second disconnected portions, each second disconnected portion including no thin metal wire between a second bent wire and an adjacent second bent wire of the plurality of second bent wires, and the plurality of first disconnected portions having no intersection with the plurality of second disconnected portions.

20. The conductive sheet according to claim 19, wherein each of the plurality of third thin metal wires includes a plurality of the third metal sides and the plurality of second disconnected portions arranged alternately.

* * * * *